United States Patent
Ogawa

(10) Patent No.: US 10,921,641 B2
(45) Date of Patent: Feb. 16, 2021

(54) LIQUID-CRYSTAL DISPLAY DEVICE AND LIGHT-SOURCE DEVICE

(71) Applicant: Funai Electric Co., Ltd., Osaka (JP)

(72) Inventor: Akihisa Ogawa, Suita (JP)

(73) Assignee: Funai Electric Co., LTD., Osaka (JP)

(*) Notice: Subject to any disclaimer, the term of this patent is extended or adjusted under 35 U.S.C. 154(b) by 7 days.

(21) Appl. No.: 15/984,861

(22) Filed: May 21, 2018

(65) Prior Publication Data

US 2018/0335669 A1 Nov. 22, 2018

(30) Foreign Application Priority Data

May 22, 2017 (JP) .............................. JP2017-100888

(51) Int. Cl.
| | |
|---|---|
| *G06F 3/042* | (2006.01) |
| *G02F 1/13357* | (2006.01) |
| *G02F 1/1335* | (2006.01) |
| *F21V 8/00* | (2006.01) |
| *H05B 45/10* | (2020.01) |
| *G06F 3/041* | (2006.01) |

(52) U.S. Cl.
CPC ..... *G02F 1/133603* (2013.01); *G02B 6/0031* (2013.01); *G02F 1/1336* (2013.01); *G02F 1/133504* (2013.01); *G02F 1/133553* (2013.01); *G06F 3/0416* (2013.01); *H05B 45/10* (2020.01); *G02F 2001/133601* (2013.01); *G02F 2203/24* (2013.01)

(58) Field of Classification Search
CPC ... G02B 27/225; G02B 6/0031; G06F 3/0416; G06F 3/0428; G02F 1/1336; G02F 1/133504; G02F 1/133553; G02F 1/1336; G02F 2001/133601; G02F 2203/24; H05B 45/10
USPC .............................................. 345/175; 348/51
See application file for complete search history.

(56) References Cited

U.S. PATENT DOCUMENTS

| | | | |
|---|---|---|---|
| 2011/0001804 A1* | 1/2011 | Urey | G02B 27/225 348/51 |
| 2012/0200537 A1* | 8/2012 | Okano | G06F 3/0416 345/175 |

(Continued)

FOREIGN PATENT DOCUMENTS

| | | |
|---|---|---|
| JP | 2016-35908 A | 3/2016 |
| TW | 201445223 A | 12/2014 |
| WO | 2012/032979 A1 | 3/2012 |

OTHER PUBLICATIONS

Extended Search Report issued in European Application No. 18173086.2, dated Sep. 19, 2018 (23 pages).

(Continued)

*Primary Examiner* — Abdul-Samad A Adediran
(74) *Attorney, Agent, or Firm* — Osha Bergman Watanabe & Burton LLP

(57) ABSTRACT

A liquid-crystal display device has a display that includes a display face, a plurality of first light sources, each of which emits a first light to a face on an opposite side of the display face, a second light source that differs from the first light source and emits a second light, and a scanner that scans the second light in the face. The scanner scans the second light in a predetermined region within a region to which the first light is irradiated. The second light overlaps the first lights in the predetermined region.

15 Claims, 13 Drawing Sheets

(56) References Cited

U.S. PATENT DOCUMENTS

| | | | |
|---|---|---|---|
| 2013/0135255 A1* | 5/2013 | Gally | G06F 3/0428 |
| | | | 345/175 |
| 2014/0354917 A1 | 12/2014 | Tseng | |
| 2016/0054517 A1 | 2/2016 | Okimoto et al. | |

OTHER PUBLICATIONS

Office Action issued in Chinese Application No. 201810480523.9, dated Sep. 30, 2020 (6 pages).

* cited by examiner

LIQUID-CRYSTAL DISPLAY DEVICE AND LIGHT-SOURCE DEVICE

CROSS-REFERENCE TO RELATED APPLICATIONS

The present U.S. patent application claims priority to Japanese Patent Application No. 2017-100888, filed on May 22, 2017, according to the Paris Convention, the entirety of which is incorporated herein by reference.

BACKGROUND

Technical Field

This invention relates to a liquid-crystal display device and a light-source device and particularly relates to a liquid-crystal display device and a light-source device that includes a plurality of light sources.

Related Art

Conventional liquid-crystal display devices and light-source devices include a plurality of light sources are known (for example, see patent literature 1).

Patent literature 1 discloses a light-source device where local dimming control is possible. Local dimming control is a technique of partially changing a brightness of a backlight of a liquid-crystal display device and increasing a contrast of a display image by individually controlling emission brightnesses of a plurality of light sources. The light-source device of patent literature 1 has a plurality of divided regions (emission blocks) where emission brightnesses can be changed individually and, with no less than one divided region as one emission unit, is configured so light sources can perform emission at predetermined emission brightnesses for each emission unit.

Moreover, one lighting unit (emission unit) includes a green laser diode (LD) to increase a purity of a green component transmitted from a green color filter of a liquid-crystal display panel. Moreover, one lighting unit further includes blue and red Light Emitting Diode (LED) light sources whose directionalities are wider than those of a laser-diode light source. Then, by diffusing a light emitted from the laser-diode light source by a diffusion-structure unit and causing the directionality of the laser-diode light source and the directionalities of the LED light sources to approach each other, a center position in a brightness distribution of the light emitted from the laser-diode light source and a center position in a brightness distribution of the lights emitted from the LED light sources are matched. By this, at a time of local dimming control, a color distribution of a backlight is made even.

Patent Literature 1: JP2016-35908 A

SUMMARY

With a conventional light-source device where local dimming control is possible such as that described in patent literature 1, to improve a precision of brightness control in local dimming control, it is necessary to further subdivide divided regions in local dimming control. Moreover, because there is a need to dispose a predetermined number of light sources in each divided region, in a situation of further subdividing the divided regions in local dimming control, a number of light sources needs to be increased. That is, with the light-source device described in patent literature 1, to further subdivide the divided regions in local dimming control, numbers of red LEDs, blue LEDs, and green laser diodes need to be increased respectively. Because of this, there is a problem where in local dimming control, to further subdivide the divided regions and improve a precision of brightness control, a component count increases.

One or more embodiments of the present invention provide a liquid-crystal display device and a light-source device that can improve a precision of brightness control while suppressing an increased component count in local dimming control.

A liquid-crystal display device according to one or more embodiments of the present invention includes a display, a plurality of first light sources that emits a light to a face on an opposite side of a display face of the display, a second light source that differs from the first light source, and a scanner that scans a light emitted from the second light source to the face on the opposite side of the display face.

In a liquid-crystal display device according to one or more embodiments of the present invention, by the scanner that scans the light emitted from the second light source to the face on the opposite side of the display face being provided, a light can be irradiated to a predetermined region of the face on the opposite side of the display face by scanning the light emitted from the second light source. As a result, the predetermined region in the display can be locally irradiated by the light emitted from the second light source without increasing a number of first light sources. That is, a region where brightness control is possible can be subdivided without increasing the number of first light sources. By this, a precision in brightness control can be improved while suppressing an increased component count.

In a liquid-crystal display device according to one or more embodiments of the present invention, the second light source is scanned so the light thereof overlaps the light emitted from the first light source in the predetermined region in the region whereto the light is being irradiated by the first light source. By configuring in this manner, because a light can be overlapped by the light irradiated from the second light source in the predetermined region in the region being irradiated by the first light source, a brightness can be increased locally in the region being irradiated by the first light source.

In one or more embodiments of the present invention, the light emitted from the second light source is overlapped on the light emitted from the first light source while changing a light amount of the light emitted from the second light source. As a result, the brightness of the predetermined region can be readily increased while performing local dimming control by changing the light amount of the second light source when scanning the predetermined region.

In a liquid-crystal display device according to one or more embodiments of the present invention, a plurality of scanning light-source units is provided, each including the second light source and the scanner. By configuring in this manner, an entire face of the face on the opposite side of the display face can be scanned more quickly compared to a situation of scanning by a single scanning light-source unit.

In one or more embodiments of the present invention, the display has a substantially rectangular shape and, viewed from a direction perpendicular to the display, each of the plurality of scanning light-source units is provided near a side of the substantially rectangular display, these sides being an opposing pair. By configuring in this manner, the light of the scanning light-source unit can be scanned from mutually opposing directions by each of the plurality of scanning light-source units being provided near a side of the display, these sides being an opposing pair. As a result, the scanning light-source unit provided to one side among the pair of sides can scan within the display on another side (or one side) of the pair of sides relative to a center of the display and the scanning light-source unit provided to the other side among the pair of sides can scan within the display on the one side (or the other side) of the pair of sides relative to the center of the display. By this, an excessive burden being applied on one of the plurality of scanning light-source units can be suppressed because sizes of the regions respectively scanned by the plurality of scanning light-source units can be made substantially identical. "Near a pair of sides" signifies both a position per se of the pair of sides and a vicinity of the position of the pair of sides.

In a liquid-crystal display device that includes the plurality of scanning light-source units, the plurality of scanning light-source units is disposed on a common base. As a result, an operation efficiency in installing the scanning light-source units can be improved because two scanning light-source units can be installed simultaneously by installing the base whereon the plurality of scanning light-source units is disposed. Moreover, compared to a situation of installing the two scanning light-source units separately, a shift in installation position between the two scanning light-source units can be suppressed from arising.

A liquid-crystal display device according to one or more embodiments of the present invention includes a reflective portion that, viewed from a direction perpendicular to the display face, is provided along an outer periphery of the display face and reflects the light emitted from the second light source to the face on the opposite side of the display face. By configuring in this manner, a light can be irradiated to the face on the opposite side of the display face while suppressing light leakage to an outer-peripheral side of the display face by the light emitted from the second light source being reflected by the reflective portion provided along the outer periphery of the display face.

A liquid-crystal display device according to one or more embodiments of the present invention includes a reflective sheet that reflects the light radiated from the first light source to a display-unit side. The reflective portion is formed by a vicinity of an outer peripheral edge of the reflective sheet being bent to the display-unit side. By configuring in this manner, an increased component count can be suppressed because the reflective portion can be formed using the reflective sheet that is already provided. "Vicinity of outer peripheral edge" signifies a vicinity of a position of the outer peripheral edge.

A liquid-crystal display device according one or more embodiments of the present invention includes a light guide member that is provided between the display and the first light source and orients the light emitted from the second light source to the display-unit side. By configuring in this manner, the light emitted from the second light source can be readily irradiated to a region comparatively separated from the second light source by the light guide member.

A liquid-crystal display device according to one or more embodiments of the present invention includes the first light source that includes a direct LED light source disposed so as to oppose the display and the second light source that includes a laser light source. A light emitted from the laser light source has a comparatively higher directionality than a light emitted from the LED light source. Therefore, by scanning by the second light source that includes the laser light source, a precision in brightness control can be readily increased.

A light-source device according to one or more embodiments of the present invention includes a plurality of first light sources; a second light source that differs from the first light source and a scanner that scans a light emitted from the second light source.

In a light-source device according to one or more embodiments of the present invention, by the scanner that scans the light emitted from the second light source being provided, the light emitted from the second light source can be scanned in a predetermined region. As a result, the predetermined region can be locally irradiated by the light emitted from the second light source without increasing a number of first light sources. By this, a precision in brightness control can be improved while suppressing an increased component count.

One or more embodiments of the present invention provides a liquid-crystal display device that includes a display that comprises a display face, a plurality of first light sources, each of which emits a first light to a face on an opposite side of the display face, a second light source that differs from the first light source and emits a second light, and a scanner that scans the second light in the face.

According to one or more embodiments of the present invention, a precision of brightness control can be improved while suppressing an increased component count in local dimming control.

DETAILED DESCRIPTION

Embodiments of the present invention will be described in detail below with reference to the drawings. In the following description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

First, a liquid-crystal display device 100 and a light-source device 200 according to a first embodiment of the present invention are described with reference to FIGS. 1 to 7(b). FIGS. 2 to 7(b) are schematic views; for simplification, illustration is omitted for members unnecessary in the description.

(Configuration of Liquid-Crystal Display Device)

Figure 1:
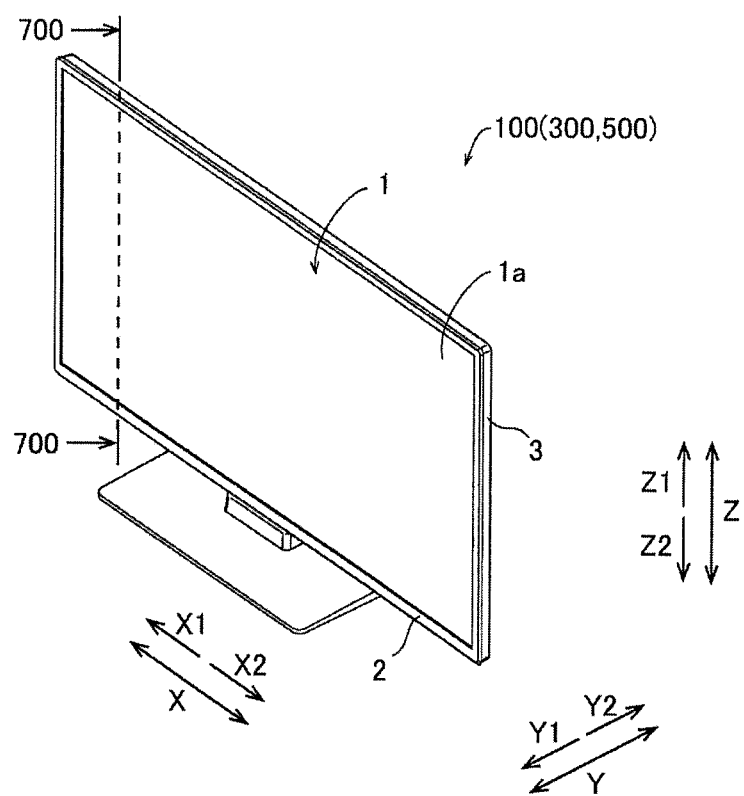
FIG. 1 is a perspective view illustrating an overall configuration of a liquid-crystal display device according to first to third embodiments of the present invention.

As illustrated in FIG. 1, the liquid-crystal display device 100 includes a display cell 1 that includes a display face 1a. The display cell 1 has a substantially rectangular shape. Moreover, the liquid-crystal display device 100 includes a front cabinet (front-side housing) 2 and a rear cabinet (rear-side housing) 3 that house the display cell 1. The display cell 1 is one example of "display."

Figure 2:
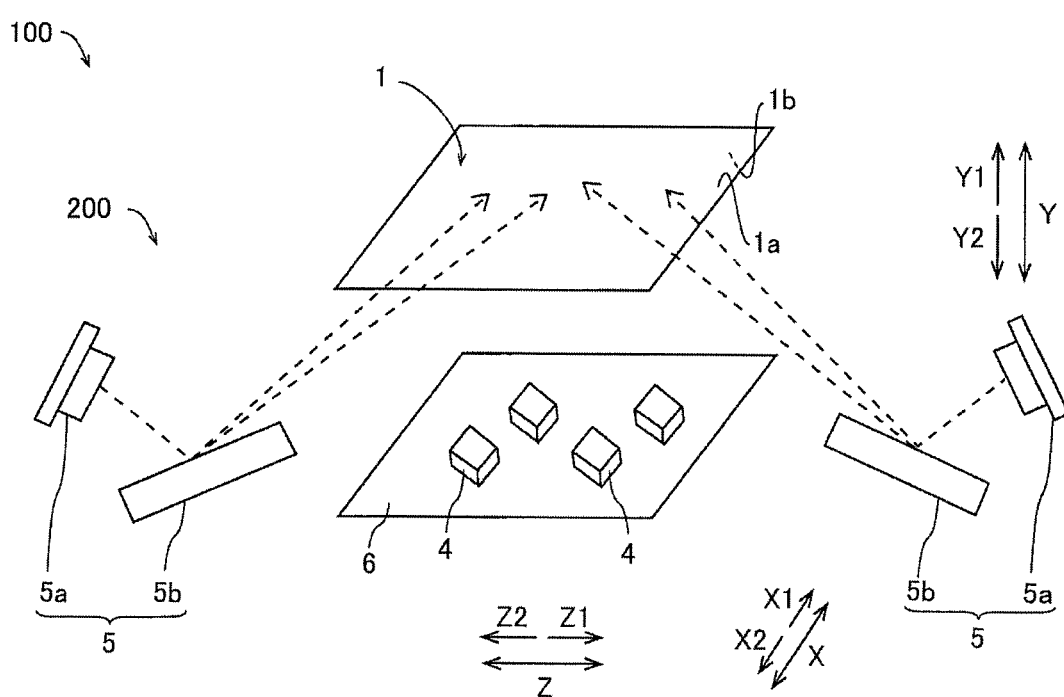
FIG. 2 is a perspective view (schematic view) of a light-source device and a display of the liquid-crystal display device according to the first embodiment of the present invention.

As illustrated in FIG. 2, the liquid-crystal display device 100 (light-source device 200) includes a plurality of LED light sources 4 and a laser light sources 5a. Moreover, the liquid-crystal display device 100 includes a reflective sheet 6 that reflects a light radiated from the LED light source 4 to a display-cell 1 side (Y1-direction side). Various optical sheets are provided between the display cell 1 and the reflective sheet 6 but are not illustrated for the sake of simplification. The LED light source 4 and the laser light source 5a are respectively one example of "first light source" and one example of "second light source."

In the first embodiment of the present invention, each of the plurality of LED light sources 4 is a direct light source disposed so as to oppose the display cell 1. That is, the plurality of LED light sources 4 emits the lights to a face 1b on an opposite side of the display face 1a of the display cell 1.

Figure 4:
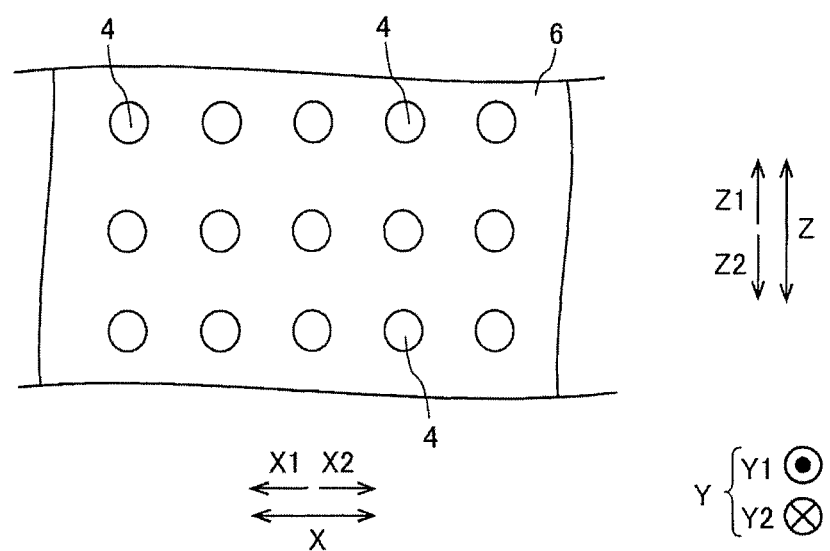
FIG. 4 is a plan view (schematic view) of a first light source of the liquid-crystal display device according to the first to third embodiments of the present invention.

For example, the LED light sources 4 are disposed in a matrix (see FIG. 4). Each of the plurality of LED light sources 4 is disposed on the reflective sheet 6. A configuration may be such that a plurality of holes is provided in the reflective sheet 6 and each of the plurality of LED light sources 4 is exposed to the display-cell 1 side (Y1-direction side) via the plurality of holes.

The liquid-crystal display device 100 is configured so local dimming control is possible by independently controlling each of the plurality of LED light sources 4.

In the first embodiment of the present invention, as illustrated in FIG. 2, the liquid-crystal display device 100 (light-source device 200) includes a scanning mirror unit 5b that scans a light emitted from the laser light source 5a on the face 1b (for example, a MEMS [microelectromechanical system] mirror, a polygon mirror, a galvano mirror, or the like). For example, one laser light source 5a and one scanning mirror unit 5b are configured as a pair. That is, the liquid-crystal display device 100 includes a scanning laser light-source unit 5 that includes one pair of the laser light source 5a and the scanning mirror unit 5b. The scanning laser light-source unit 5 includes an optical system that is not illustrated in addition to the laser light source 5a and the scanning mirror unit 5b. The scanning mirror unit 5b and the scanning laser light-source unit 5 are respectively one example of "scanner" and one example of "scanning light-source unit" in one or more embodiments of the present invention.

In the first embodiment of the present invention, a plurality of scanning laser light-source units 5 is provided (in the first embodiment, two are provided). For example, the plurality of scanning laser light-source units 5 is provided in substantially identical height positions in a Y direction.

Figure 3:
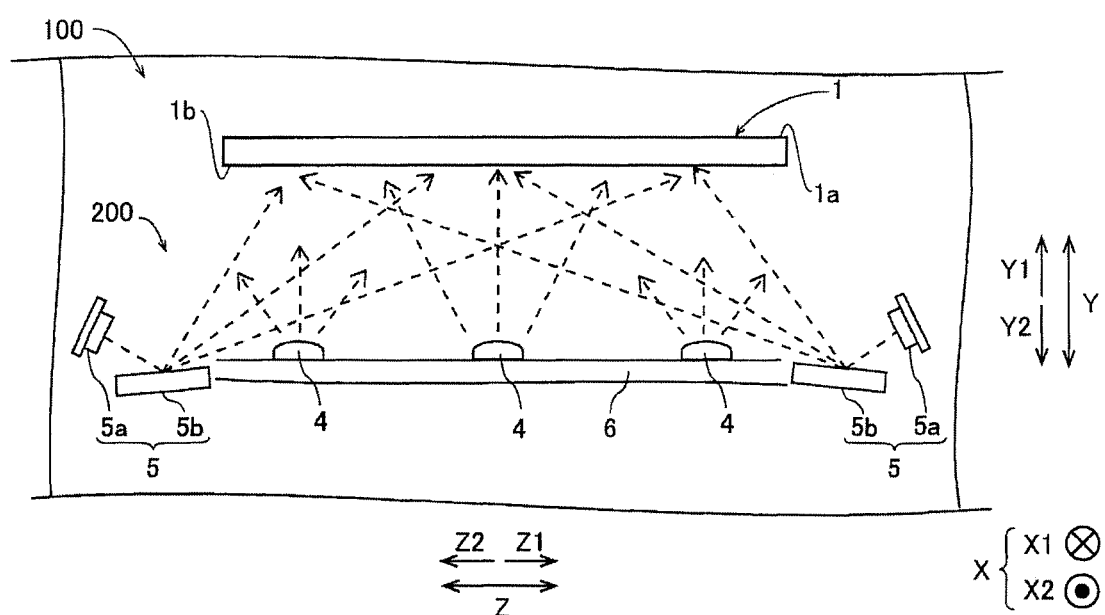
FIG. 3 is a cross-sectional view (schematic view) at line 700-700 in FIG. 1.

In the first embodiment of the present invention, as illustrated in FIG. 3, the laser light source 5a is scanned so the light thereof overlaps the light emitted from the LED light source 4 in a predetermined region in a region whereto the light is being irradiated by the LED light source 4. For example, the laser light source 5a scans an entire range of the display cell 1 by the scanning mirror unit 5b. That is, each of the two laser light sources 5a scans half of the entire range of the display cell 1 (see FIG. 5). While in FIG. 3 the laser light source 5a is disposed on the Y1-direction side and the scanning mirror unit 5b is disposed on a Y2-direction side of the LED light source 4, disposition positions are not limited thereto.

Furthermore, the first embodiment of the present invention is configured to overlap the light emitted from the laser light source 5a on the light emitted from the LED light source 4 without changing a light amount of the light emitted from the LED light source 4 but while changing a light amount of the light emitted from the laser light source 5a. For example, the light amount of the laser light source 5a is increased at a timing where, while scanning the laser light source 5a, the light emitted from the laser light source 5a is being irradiated to the predetermined region. Moreover, at a timing where the light emitted from the laser light source 5a is being irradiated outside the predetermined region, the light amount of the light emitted from the laser light source 5a is decreased (or made to be zero). The predetermined region is selected by a control unit (not illustrated) of the laser light source 5a. For example, the control unit may select a region corresponding to an LED light source 4 whose light amount is comparatively large among the plurality of LED light sources 4. Moreover, the control unit may select one or a plurality of regions.

Figure 5:
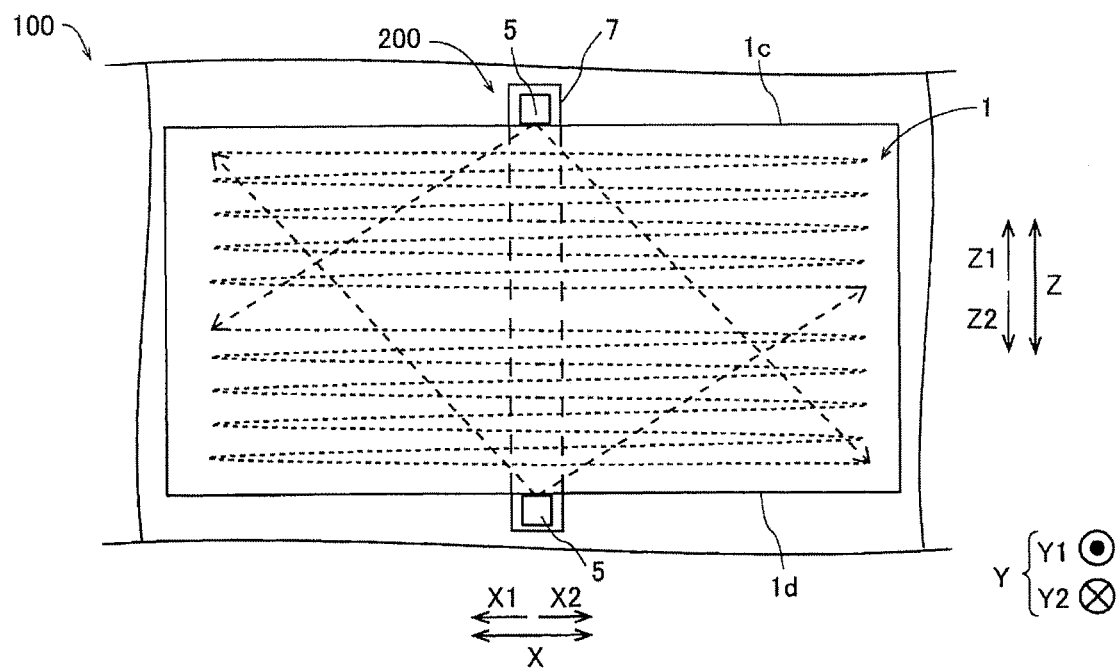
FIG. 5 is a plan view (schematic view) of the light-source device and the display of the liquid-crystal display device according to the first embodiment of the present invention.

In the first embodiment of the present invention, as illustrated in FIG. 5, viewed from a direction perpendicular to the display cell 1 (Y direction), each of the two scanning laser light-source units 5 is provided near a side of the substantially rectangular display cell 1, these sides being an opposing pair. For example, viewed from the direction perpendicular to the display cell 1 (Y direction), each of the two scanning laser light-source units 5 is disposed on an outer side of the display cell 1. For example, viewed from the Y direction, the laser light source 5a (see FIG. 2) and the scanning mirror unit 5b (see FIG. 2) are each disposed so as to not overlap the display cell 1. The scanning mirror unit 5b is disposed on the display-cell 1 side relative to the laser light source 5a paired thereto (see FIG. 3).

In the first embodiment of the present invention, viewed from the direction perpendicular to the display cell 1 (Y direction), the two scanning laser light-source units 5 are respectively disposed near one long side 1*c* among a pair of long sides of the display cell 1 and near the other long side 1*d* among the pair of long sides. For example, the two scanning laser light-source units 5 are respectively disposed in a substantial center of the long side 1*c* and a substantial center of the long side 1*d*. Moreover, the light emitted from the scanning laser light-source unit 5 near the long side 1*c* is scanned in a region on a lower side (Z2-direction side) of the display cell 1, and the light emitted from the scanning laser light-source unit 5 near the long side 1*d* is scanned in a region on an upper side (Z1-direction side) of the display cell 1. The light emitted from the scanning laser light-source unit 5 near the long side 1*c* may be scanned in the region on the upper side (Z1-direction side) of the display cell 1 and the light emitted from the scanning laser light-source unit 5 near the long side 1*d* may be scanned in the region on the lower side (Z2-direction side) of the display cell 1.

In the first embodiment of the present invention, the two scanning laser light-source units 5 are disposed on a common base 7. For example, the laser light source 5*a* and the scanning mirror unit 5*b* of the scanning laser light-source unit 5 near the long side 1*c* and the laser light source 5*a* and the scanning mirror unit 5*b* of the scanning laser light-source unit 5 near the long side 1*d* are each disposed on the same base 7.

In the first embodiment of the present invention, the base 7 is made of metal. For example, the base 7 is molded by aluminum, iron, or the like.

Comparative Example (Scanning Laser Light-Source Unit Absent)

Figure 6A:
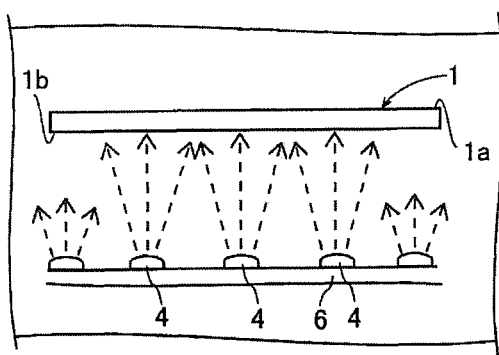
FIGS. 6(a)-6(b) are diagrams for describing an irradiation region of a light of a liquid-crystal display device according to a comparative example.
Figure 6B:
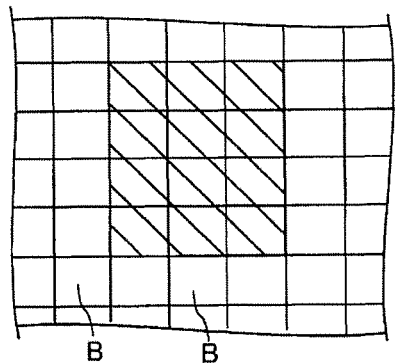

As illustrated in FIG. 6(*a*), with a liquid-crystal display device (light-source device) that, as is conventionally the case, is not provided with the scanning laser light-source unit 5 (see FIG. 3), only the LED light source 4 irradiates a light to the display cell 1. In this situation, as illustrated in FIG. 6(*b*), control is possible so, by the plurality of (in FIG. 6(*a*), three) LED light sources 4, among a plurality of divided regions B in the display cell 1, a brightness in a range of, for example, 3×4 divided regions B (range of diagonal-line portion) is greater than that of another region.

(Scanning Laser Light-Source Unit Present)

Figure 7A:
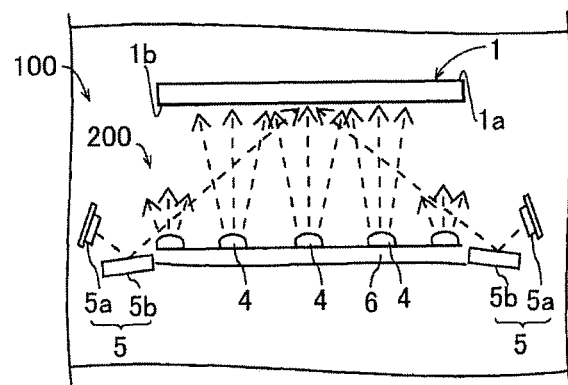
FIGS. 7(a)-7(b) are diagrams for describing an irradiation region of a light of the liquid-crystal display device according to the first embodiment of the present invention.
Figure 7B:
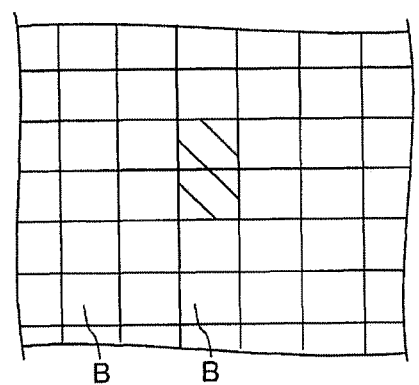

Furthermore, as illustrated in FIG. 7(*a*), with the liquid-crystal display device 100 (light-source device 200) that includes the scanning laser light-source unit 5, the LED light source 4 and the laser light source 5*a* each irradiate a light to the display cell 1. In this situation, as illustrated in FIG. 7(*b*), control is possible so, by the light emitted from the laser light source 5*a* overlapping the lights emitted from the plurality of (in FIG. 6(*a*), three) LED light sources 4, among the plurality of divided regions B in the display cell 1, a brightness in a range of, for example, 1×2 divided regions B (range of diagonal-line portion) is greater than that of another region. The range of the region where the brightness can be increased is but one example and is not limited thereto. That is, by providing the scanning laser light-source unit 5 (laser light source 5*a*), it is possible to increase a precision in brightness control.

The first embodiment of the present invention may provide the following advantages.

The liquid-crystal display device 100 according to the first embodiment of the present invention includes the display cell 1, the plurality of LED light sources 4 that emits the light to the face 1*b* on the opposite side of the display face 1*a* of the display cell 1, the laser light source 5*a* that differs from the LED light source 4, and the scanning mirror unit 5*b* that scans the light emitted from the laser light source 5*a* to the face 1*b* on the opposite side of the display face 1*a*. By this, a light can be irradiated to the predetermined region of the face 1*b* on the opposite side of the display face 1*a* by scanning the light emitted from the laser light source 5*a*. As a result, the predetermined region in the display cell 1 can be locally irradiated by the light emitted from the laser light source 5*a* without increasing the number of LED light sources 4. That is, a region where brightness control is possible can be further subdivided without increasing the number of LED light sources 4. By this, a precision in brightness control can be improved while suppressing an increased component count.

In the first embodiment of the present invention, as above, the liquid-crystal display device 100 is configured so the laser light source 5*a* is scanned so the light thereof overlaps the light emitted from the LED light source 4 in the predetermined region in the region whereto the light is being irradiated by the LED light source 4. By this, because a light can be overlapped by the light irradiated from the light source 5*a* in the predetermined region in the region being irradiated by the LED light source 4, a brightness can be increased locally in the region being irradiated by the LED light source 4.

In the first embodiment of the present invention, as above, the liquid-crystal display device 100 is configured so the light emitted from the laser light source 5*a* is overlapped on the light emitted from the LED light source 4 while changing the light amount of the light emitted from the laser light source 5*a*. By this, the brightness of the predetermined region can be readily increased while performing local dimming control by changing the light amount of the laser light source 5*a* when scanning the predetermined region.

In the first embodiment of the present invention, as above, the liquid-crystal display device 100 is configured so the plurality of scanning laser light-source units 5 is provided, each including the laser light source 5*a* and the scanning mirror unit 5*b*. By this, an entire face of the face 1*b* on the opposite side of the display face 1*a* can be scanned more quickly compared to a situation of scanning by a single scanning laser light-source unit 5.

In the first embodiment of the present invention, as above, the liquid-crystal display device 100 is configured so, viewed from the direction perpendicular to the display cell 1, each of the plurality of scanning laser light-source units 5 is provided near a side of the substantially rectangular display cell 1, these sides being an opposing pair. By this, the light of the scanning laser light-source unit 5 can be scanned from mutually opposing directions by each of the plurality of scanning laser light-source units 5 being provided near a side of the display cell 1, these sides being an opposing pair. As a result, the scanning laser light-source unit 5 provided to one side among the pair of sides can scan within the display cell 1 on another side (or one side) of the pair of sides relative to a center of the display cell 1 and the scanning laser light-source unit 5 provided to the other side among the pair of sides can scan within the display cell 1 on the one side (or the other side) of the pair of sides relative to the center of the display cell 1. By this, an excessive burden being applied on one of the plurality of scanning laser light-source units 5 can be suppressed because sizes of the regions respectively scanned by the plurality of scanning laser light-source units 5 can be made substantially identical.

In the first embodiment of the present invention, as above, the liquid-crystal display device 100 is configured so, viewed from the direction perpendicular to the display cell 1, each of the plurality of scanning laser light-source units 5 is disposed near a side of the display cell 1, these sides being an opposing pair, and on the outer side of the display cell 1. By this, the light from the LED light source 4 being blocked by the plurality of scanning laser light-source units 5 can be further suppressed.

In the first embodiment of the present invention, as above, the liquid-crystal display device 100 is configured so provided are two scanning laser light-source units 5 and, viewed from the direction perpendicular to the display cell 1, the two scanning laser light-source units 5 are respectively disposed near the one long side 1c among the pair of long sides of the display cell 1 and near the other long side 1d among the pair of long sides. By this, a device outer shape of the liquid-crystal display device 100 becoming large in a direction wherein the long sides of the display cell 1 extend can be suppressed by the two scanning laser light-source units 5 being respectively disposed near the one long side 1c among the pair of long sides of the display cell 1 and near the other long side 1d among the pair of long sides.

In the first embodiment of the present invention, as above, the liquid-crystal display device 100 is configured so the two scanning laser light-source units 5 are respectively disposed in the substantial center of the one long side 1c among the pair of long sides and in the substantial center of the other long side 1d among the pair of long sides. By this, the scanning mirror unit 5b can be readily controlled because scanning angles of the scanning mirror units 5b on the one side and the other side in the two scanning laser light-source units 5 become substantially equal (substantially symmetrical).

In the first embodiment of the present invention, as above, the liquid-crystal display device 100 is configured so the two scanning laser light-source units 5 are disposed on the same base 7. By this, an operation efficiency in installing the scanning laser light-source units 5 can be improved because two scanning laser light-source units 5 can be installed simultaneously by installing the base 7 whereon the two scanning laser light-source units 5 are disposed. Moreover, compared to a situation of installing the two scanning laser light-source units 5 separately, a shift in installation position between the two scanning laser light-source units 5 can be suppressed from arising.

In the first embodiment of the present invention, as above, the liquid-crystal display device 100 is configured so the base 7 includes a base made of metal. By this, heat dissipation of the scanning laser light-source unit 5 can be readily performed.

In the first embodiment of the present invention, as above, the liquid-crystal display device 100 is configured to use the LED light source 4 as the direct light source and the laser light source 5a as the light source that is scanned. Here, the light emitted from the laser light source has a comparatively higher directionality than the light emitted from the LED light source. Therefore, by scanning by the laser light source 5a, a precision of brightness control can be readily increased.

The light-source device 200 according to the first embodiment of the present invention includes the plurality of LED light sources 4, the laser light source 5a that differs from the LED light source 4, and the scanning mirror unit 5b that scans the light emitted from the laser light source 5a. By this, the light emitted from the laser light source 5a can be scanned in the predetermined region. As a result, the predetermined region can be locally irradiated by the light emitted from the laser light source 5a without increasing the number of LED light sources 4. By this, a precision in brightness control can be improved while suppressing an increased component count.

Second Embodiment

Figure 8:
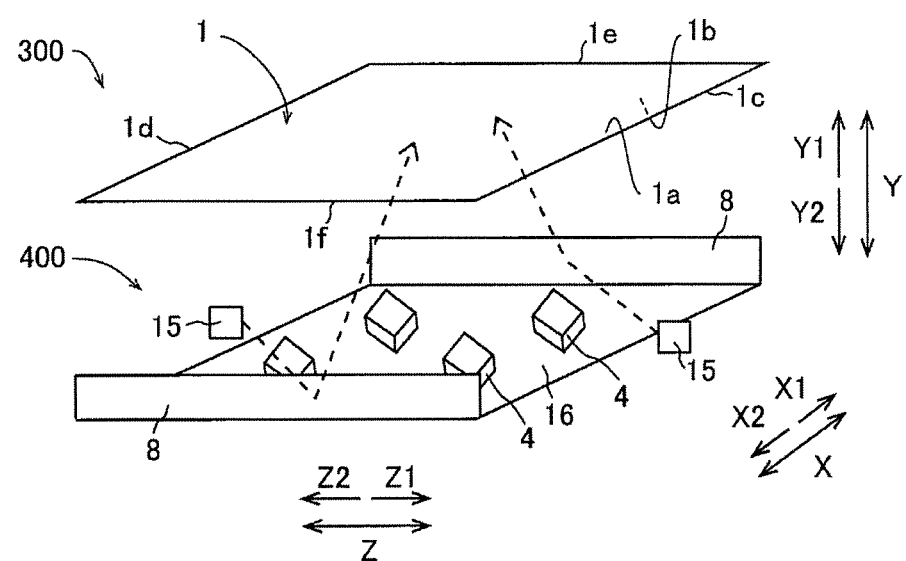
FIG. 8 is a perspective view (schematic view) of a light-source device and the display of a liquid-crystal display device according to the second embodiment of the present invention.

Next, configurations of a liquid-crystal display device 300 and a light-source device 400 according to a second embodiment of the present invention are described with reference to FIG. 8. This liquid-crystal display device 300 in the second embodiment of the present invention differs from the first embodiment of the present invention, where the light emitted from the scanning laser light-source unit 5 directly irradiates the display cell 1, and a light emitted from a scanning laser light-source unit 15 is irradiated to the display cell 1 upon being reflected by a reflective portion 8. FIG. 8 is a schematic view; for simplification, illustration is omitted for members unnecessary in the description.

(Configuration of Liquid-Crystal Display Device)

As illustrated in FIG. 8, the liquid-crystal display device 300 (light-source device 400) includes two scanning laser light-source units 15. Moreover, the liquid-crystal display device 300 includes a reflective sheet 16 that reflects the light radiated from the LED light source 4 to the display cell 1 side (Y1-direction side). The scanning laser light-source unit 15 is of a configuration similar to the scanning laser light-source unit 5 according to the first embodiment of the present invention and is disposed in a position similar to the scanning laser light-source unit 5. The scanning laser light-source unit 15 is one example of "scanning light-source unit" in one or more embodiments of the present invention.

In the second embodiment of the present invention, the liquid-crystal display device 300, viewed from the direction perpendicular to the display cell 1 (Y direction), includes the reflective portion 8, which is provided along an outer periphery of the display cell 1. The reflective portion 8 reflects the light emitted from the laser light source 5a, which is included in the scanning laser light-source unit 15, to the face 1b on the opposite side of the display face 1a. For example, provided is a plurality of reflective portions 8 (in the second embodiment of the present invention, two are provided). Moreover, viewed from the direction perpendicular to the display cell 1 (Y direction), the two reflective portions 8 are respectively provided so as to be along a short side 1e and a short side 1f of the substantially rectangular display cell 1, these sides being an opposing pair.

In the second embodiment of the present invention, the reflective portion 8 is formed by a vicinity of an outer peripheral edge of the reflective sheet 16 being bent to the display-cell 1 side (Y1-direction side). That is, the reflective sheet 16 and the reflective portion 8 are formed integrally by the same member. Moreover, viewed from the direction perpendicular to the display cell 1 (Y direction), the two reflective portions 8 are respectively disposed near the short side 1e and near the short side 1f.

For example, each of the two reflective portions 8 is bent in a direction that intersects a plane (XZ plane) whereon the display cell 1 extends. For example, viewed from a Z direction, an angle between the display cell 1 and the reflective portion 8 is about 90 degrees. The angle between the display cell 1 and the reflective portion 8 may be an angle other than 90 degrees. Moreover, the reflective portion 8 per se may have a bent shape or a curved shape.

Other configurations of the second embodiment of the present invention are similar to those of the first embodiment of the present invention.

The second embodiment of the present invention may provide the following advantages.

The liquid-crystal display device 300 according to the second embodiment of the present invention includes the reflective portion 8 that is provided along the outer periphery of the display cell 1 and reflects the light emitted from the laser light source 5a to the face 1b on the opposite side of the display face 1a. By this, a light can be irradiated to the face 1b on the opposite side of the display face 1a while suppressing light leakage to an outer-peripheral side of the display cell 1 by the light emitted from the laser light source 5a being reflected by the reflective portion 8 provided along the outer periphery of the display cell 1.

In the liquid-crystal display device 300 according to the second embodiment of the present invention, the reflective portion 8 is formed by the vicinity of the outer peripheral edge of the reflective sheet 16 being bent to the display-cell 1 side. By this, an increased component count can be suppressed because the reflective portion 8 can be formed using the reflective sheet 16 that is already provided.

Other advantages of the second embodiment of the present invention are similar to those of the first embodiment of the present invention.

Third Embodiment

Figure 9:
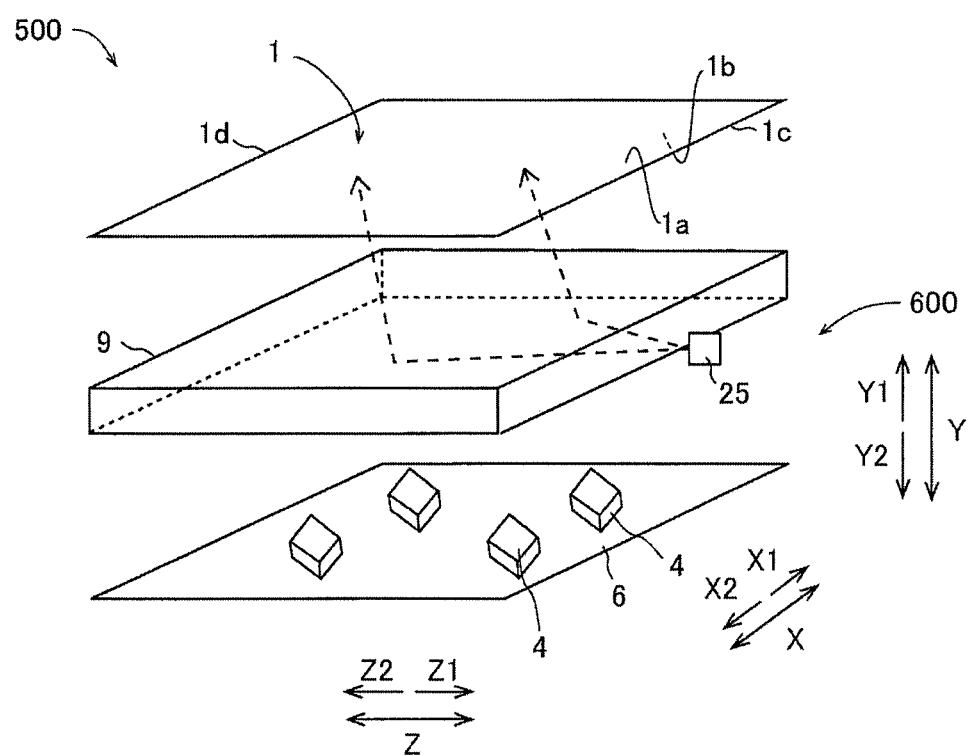
FIG. 9 is a perspective view (schematic view) of a light-source device and the display of a liquid-crystal display device according to third embodiment of the present invention.

Next, configurations of a liquid-crystal display device 500 and a light-source device 600 according to a third embodiment of the present invention are described with reference to FIG. 9. This liquid-crystal display device 500 in the third embodiment of the present invention differs from the first embodiment of the present invention, where the light emitted from the scanning laser light-source unit 5 directly irradiates the display cell 1, and a light emitted from a scanning laser light-source unit 25 is irradiated to the display cell 1 via a light guide plate 9. FIG. 9 is a schematic view; for simplification, illustration is omitted for members unnecessary in the description.

(Configuration of Liquid-Crystal Display Device)

As illustrated in FIG. 9, the liquid-crystal display device 500 (light-source device 600) includes a single scanning laser light-source unit 25. The scanning laser light-source unit 25, viewed from the direction perpendicular to the display cell 1 (Y direction), is provided near the long side 1c of the substantially rectangular display cell 1 and on the outer side. Moreover, viewed from the direction perpendicular to the display cell 1 (Y direction), the scanning laser light-source unit 25 is disposed in the substantial center of the long side 1c. The scanning laser light-source unit 25 is of a configuration similar to the scanning laser light-source unit 5 of the first embodiment of the present invention. The scanning laser light-source unit 25 is one example of "scanning light-source unit" in one or more embodiments of the present invention.

In the third embodiment of the present invention, the liquid-crystal display device 500 includes the light guide plate 9, which is provided between the display cell 1 and the LED light source 4. The light guide plate 9 orients the light emitted from the laser light source 5a to the display-cell 1 side. For example, the light guide plate 9 is provided so as to oppose the display cell 1. Moreover, the scanning laser light-source unit 25 is provided on a Z1-direction side of the light guide plate 9. The light guide plate 9 and the scanning laser light-source unit 25 are disposed in substantially identical height positions in the Y direction. For example, the light emitted from the scanning laser light-source unit 25 enters the light guide plate 9 from the Z1-direction side and, upon passing through the light guide plate 9, is irradiated to the predetermined region of the display cell 1. The light guide plate 9 is one example of "light guide member" in one or more embodiments of the present invention.

Other configurations of the third embodiment of the present invention are similar to those of the first embodiment of the present invention.

The third embodiment of the present invention may provide the following advantages.

In the third embodiment of the present invention, the liquid-crystal display device 500 is configured so as to be provided with the light guide plate 9 that is provided between the display cell 1 and the LED light source 4 and orients the light emitted from the laser light source 5a to the display-cell 1 side. By this, the light emitted from the laser light source 5a can be readily irradiated to a region comparatively separated from the laser light source 5a by the light guide plate 9.

Other advantages of the third embodiment of the present invention are similar to those of the first embodiment of the present invention.

Modified Examples

One or more embodiments of the present invention disclosed here are examples on all counts and should be considered non-limiting. The scope of the present invention is indicated not by the description of one or more embodiments of the present invention but by the scope of patent claims and further includes meanings equivalent to the scope of patent claims and all modifications (modified examples) within the scope.

Figure 10:
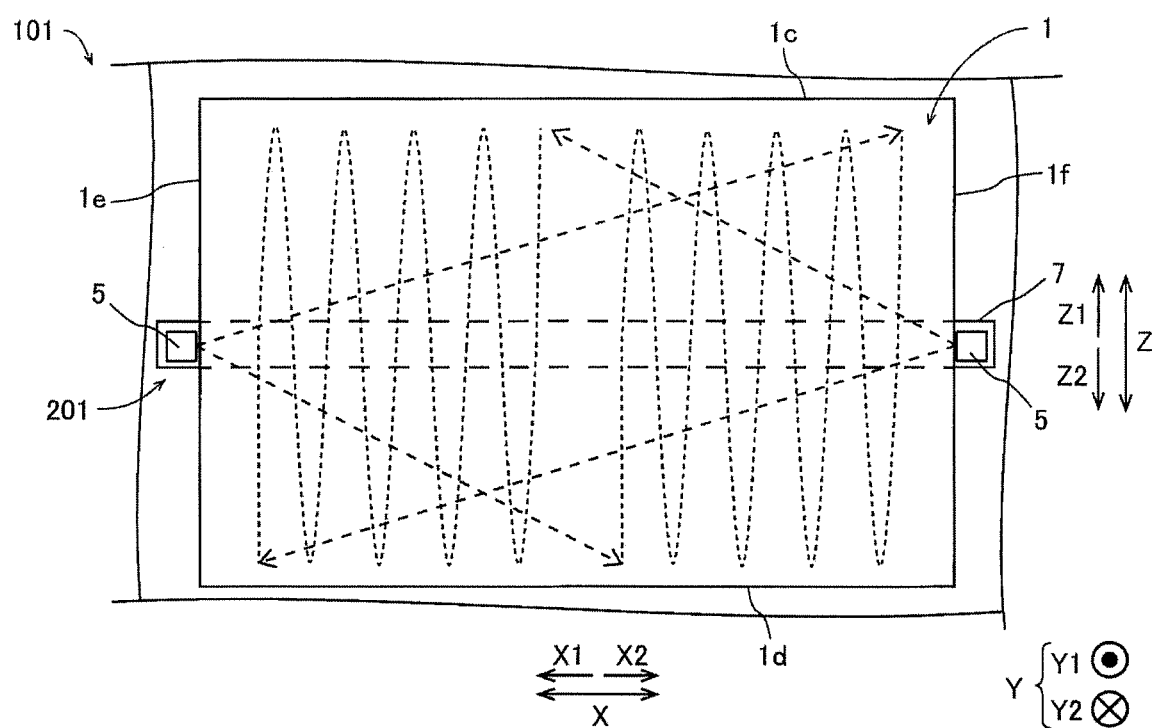
FIG. 10 is a plan view (schematic view) of a light-source device and the display of a liquid-crystal display device according to a first modified example of the first embodiment of the present invention.

For example, in the first embodiment of the present invention, an example is illustrated where two scanning light-source units (scanning laser light-source units 5) are respectively disposed near a pair of long sides (long side 1c and long side 1d), but the present invention is not limited thereto. For example, as illustrated in FIG. 10, with a liquid-crystal display device 101 (light-source device 201), two scanning light-source units (scanning laser light-source units 5) are respectively disposed near the short side 1e and near the short side 1f. In the second embodiment of the present invention as well, similarly, two scanning light-source units (scanning laser light-source units 15) may be respectively disposed near the short side 1e and near the short side 1f. In the third embodiment of the present invention, similarly, a scanning light-source unit (scanning laser light-source unit 25) may be disposed near another (long side 1d) among a pair of long sides, near the short side 1e, or near the short side 1f. FIG. 10 is a schematic view; for simplification, illustration is omitted for members unnecessary in the description.

Figure 11:
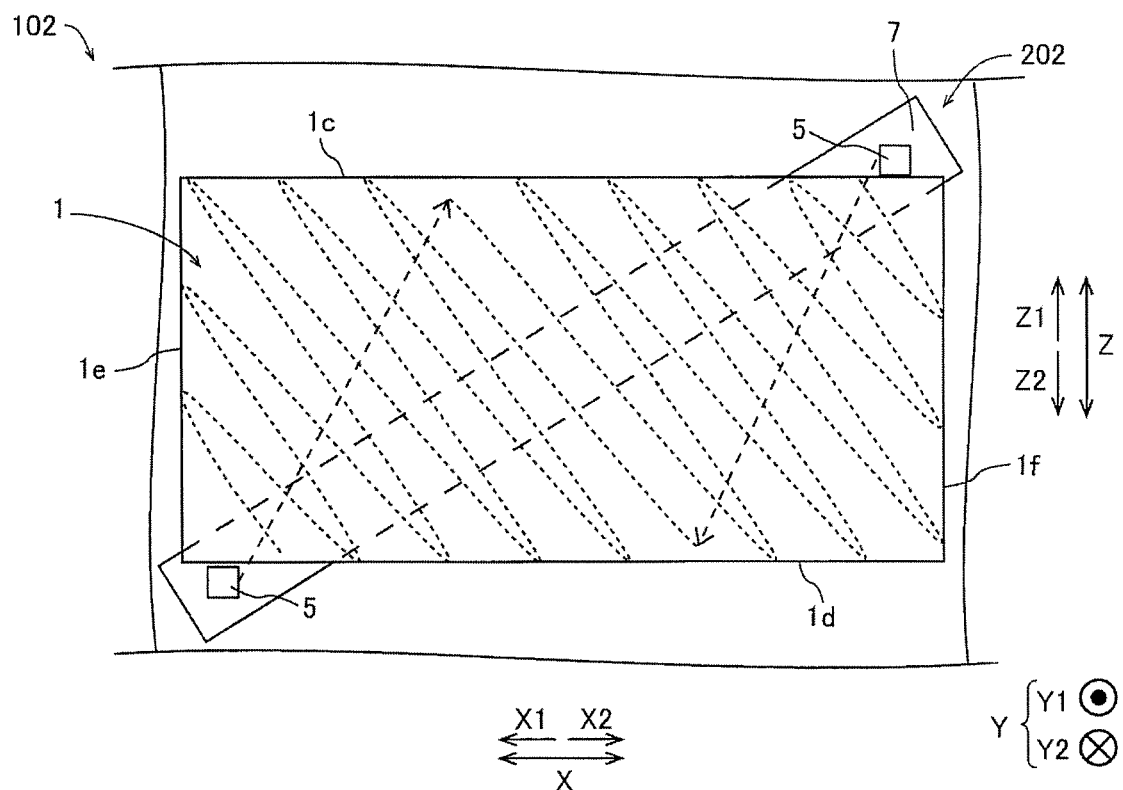
FIG. 11 is a plan view (schematic view) of a light-source device and the display of a liquid-crystal display device according to a second modified example of the first embodiment of the present invention.

In the first embodiment of the present invention, an example is illustrated where two scanning light-source units (scanning laser light-source units 5) are respectively disposed in substantial centers of a pair of long sides (substantial center of long side 1c and substantial center of long side 1d), but the present invention is not limited thereto. For example, as illustrated in FIG. 11, with a liquid-crystal display device 102 (light-source device 202), two scanning light-source units (scanning laser light-source units 5) are respectively disposed at end portions of a pair of long sides (end portion of long side 1c and end portion of long side 1d). In the second embodiment of the present invention as well, similarly, two scanning light-source units (scanning laser light-source units 15) may be respectively disposed near end portions of a pair of long sides (end portion of long side 1c and end portion of long side 1*d*). In the third embodiment of the present invention, similarly, the scanning laser light-source unit 25 may be disposed at an end portion of another (long side 1*d*) among a pair of long sides, an end portion of the short side 1*e*, or an end portion of the short side 1*f*. FIG. 11 is a schematic view; for simplification, illustration is omitted for members unnecessary in the description.

Figure 12:
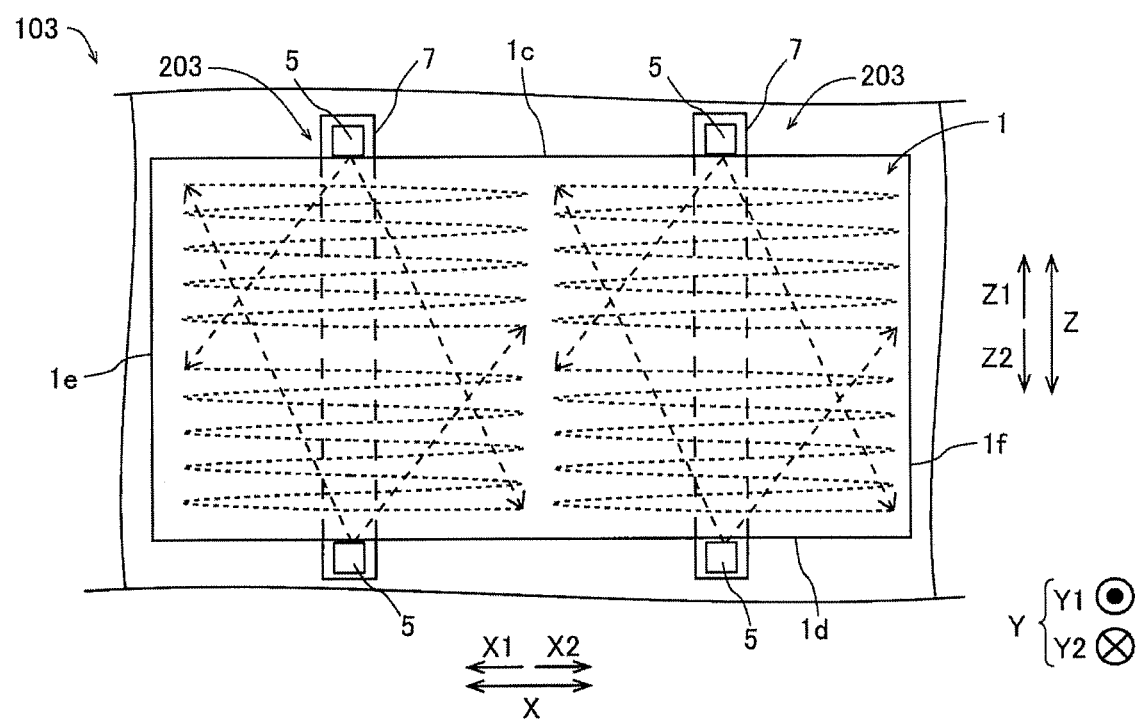
FIG. 12 is a plan view (schematic view) of a light-source device and the display of a liquid-crystal display device according to a third modified example of the first embodiment of the present invention.

In the first embodiment of the present invention, an example is illustrated where two scanning light-source units (scanning laser light-source units 5) are respectively disposed near a pair of long sides (near the long side 1*c* and near the long side 1*d*), but the present invention is not limited thereto. For example, as illustrated in FIG. 12, with a liquid-crystal display device 103 (light-source device 203), one set of two among four scanning light-source units (scanning laser light-source units 5) is disposed near one side (long side 1*c*) among a pair of long sides and the other set of two among the four scanning light-source units (scanning laser light-source units 5) is disposed near the other side (long side 1*d*) among the pair of long sides. In this situation, the two scanning light-source units (scanning laser light-source units 5) provided opposing each other are respectively disposed on common bases 7. Moreover, by the two scanning light-source units (scanning laser light-source units 5) on an X1-direction side, a half face on an X1-direction side of a display (display cell 1) is scanned and by the two scanning light-source units (scanning laser light-source units 5) on an X2-direction side, a half face on an X2-direction side of the display (display cell 1) is scanned. The two scanning light-source units (scanning laser light-source units 5) near the long side 1*c* and the two scanning light-source units (scanning laser light-source units 5) near the long side 1*d* may be respectively disposed on common bases 7 or the four scanning light-source units (scanning laser light-source units 5) may be disposed on a common base 7. FIG. 12 is a schematic view; for simplification, illustration is omitted for members unnecessary in the description.

In the second embodiment of the present invention as well, similarly, one set of two among four scanning light-source units (scanning laser light-source units 15) may be disposed near one side (long side 1*c*) among a pair of long sides and the other set of two among the four scanning light-source units (scanning laser light-source units 15) may be disposed near the other side (long side 1*d*) among the pair of long sides. In the third embodiment of the present invention as well, two scanning light-source units (scanning laser light-source units 25) may be disposed near another side (long side 1*d*) among a pair of long sides, near the short side 1*e*, or near the short side 1*f*.

Figure 13:
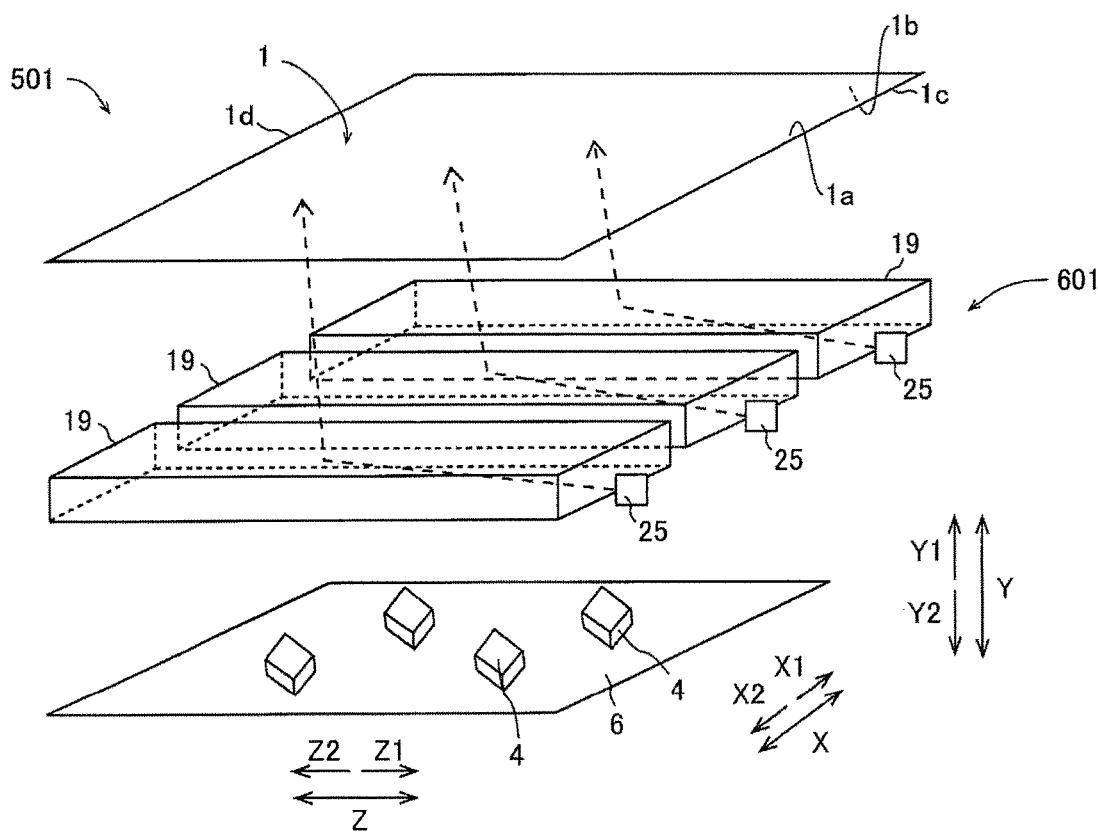
FIG. 13 is a perspective view (schematic view) of a light-source device and a display of a liquid-crystal display device according to a modified example of the third embodiment of the present invention.

In the third embodiment of the present invention, an example is illustrated where a single light guide member (light guide plate 9) is provided, but the present invention is not limited thereto. For example, as illustrated in FIG. 13, with a liquid-crystal display device 501 (light-source device 601), provided is a light guide member (light guide plate 19) divided into three. In this situation, a scanning light-source unit (scanning laser light-source unit 25) is provided on a Z1-direction side of each light guide member (light guide plate 19). A configuration may be such that the light guide member divided into three (light guide plate 19) is only provided with a single scanning light-source unit (scanning laser light-source unit 25). FIG. 13 is a schematic view; for simplification, illustration is omitted for members unnecessary in the description. The light guide plate 19 is one example of "light guide member" in one or more embodiments of the present invention.

In the second embodiment of the present invention, an example is illustrated where the reflective portion 8 is formed by the vicinity of the outer peripheral edge of the reflective sheet 16 being bent to a display-unit (display-cell 1) side, but the present invention is not limited thereto. For example, by providing a separate member such as a reflective mirror, a light emitted from a scanning light-source unit (scanning laser light-source unit 15) may be reflected.

In the second embodiment of the present invention, an example is illustrated where, viewed from a direction perpendicular to a display (display cell 1) (Y direction), two reflective portions 8 are respectively provided so as to be along a short side 1*e* and a short side 1*f* of a substantially rectangular display (display cell 1), these sides being an opposing pair, but the present invention is not limited thereto. For example, viewed from the direction perpendicular to the display (display cell 1), the reflective portion 8 may be provided so as to be along all four sides of the display (display cell 1).

In the first to third embodiments of the present invention, examples are illustrated where one second light source (laser light source 5*a*) and one scanner (scanning mirror unit 5*b*) are configured as a pair, but the present invention is not limited thereto. For example, in one scanning light-source unit (scanning laser light-source unit 5 [15, 25]), a plurality may be provided of at least one from among the second light source (laser light source 5*a*) and the scanner (scanning mirror unit 5*b*).

In the first to third embodiments of the present invention, examples are illustrated where a scanner (scanning mirror unit 5*b*) is disposed on a display-unit (display-cell 1) side of a second light source (laser light source 5*a*) with which it is paired, but the present invention is not limited thereto. For example, the second light source (laser light source 5*a*) may be disposed on the display-unit (display-cell 1) side of the scanner (scanning mirror unit 5*b*) with which it is paired.

In the first to third embodiments of the present invention, examples are illustrated where, viewed from a direction perpendicular to a display (display cell 1) (Y direction), a scanning light-source unit (scanning laser light-source unit 5 [15, 25]) is disposed on an outer side of the display (display cell 1), but the present invention is not limited thereto. For example, viewed from the direction perpendicular to the display (display cell 1) (Y direction), the scanning light-source unit (scanning laser light-source unit 5 [15, 25]) may be disposed so as to overlap the display (display cell 1).

In the first to third embodiments of the present invention, examples are illustrated where a second light source is a laser light source, but the present invention is not limited thereto. For example, the second light source may be an LED light source.

In the first to third embodiments of the present invention, examples are illustrated where first light sources (LED light sources 4) are disposed in a matrix, but the present invention is not limited thereto. For example, the first light sources (LED light sources 4) may be disposed in a line.

In the first and second embodiments of the present invention, examples are illustrated where two scanning light-source units (scanning laser light-source units 5 [15]) are provided in substantially identical height positions in a Y direction, but the present invention is not limited thereto. For example, two scanning light-source units (scanning laser light-source units 5 [15]) may be provided in mutually different height positions in the Y direction.

In the second embodiment of the present invention, an example is illustrated of a configuration provided with the reflective portion 8, but the present invention is not limited thereto. For example, a configuration may be one where the reflective portion 8 and a light guide member of the third embodiment of the present invention (light guide plate 9 [19]) are combined.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

1 Display cell (display)
1*a* Display face
1*b* Face
4 LED light source (first light source)
5, 15, 25 Scanning laser light-source unit (scanning light-source unit)
5*a* Laser light source (second light source)
5*b* Scanning mirror unit (scanner)
6, 16 Reflective sheet
7 Base
8 Reflective portion
9, 19 Light guide plate (light guide member)
100, 101, 102, 103, 300, 500, 501 Liquid-crystal display device
200, 201, 202, 203, 400, 600, 601 Light-source device

What is claimed is:

1. A liquid-crystal display device, comprising:
   a display that comprises a display face;
   a plurality of first light sources, each of which emits a first light to a face on an opposite side of the display face without changing a direction of the first light;
   a second light source that differs from each of the plurality of first light sources and emits a second light; and
   a scanner that scans the second light in the face on the opposite side,
   wherein each of the plurality of first light sources is a direct Light Emitting Diode (LED) light source disposed to oppose the display,
   wherein the second light source is a laser light source,
   wherein the scanner scans the second light in a predetermined region within a region to which the first light is irradiated, and
   wherein the second light overlaps the first light in the predetermined region.

2. The liquid-crystal display device according to claim 1, wherein the second light source causes a light amount of the second light to be changed and causes the second light to be overlapped on the first light.

3. The liquid-crystal display device according to claim 2, further comprising:
   a plurality of scanning light-source units,
   wherein each of the plurality of scanning light-source units comprises the second light source and the scanner.

4. The liquid-crystal display device according to claim 2, further comprising:
   a reflective portion that, viewed from a direction perpendicular to the display face, is provided along an outer periphery of the display face,
   wherein the reflective portion reflects the second light to the face on the opposite side.

5. The liquid-crystal display device according to claim 2, wherein the first light source causes a light amount of the first light to be unchanged.

6. The liquid-crystal display device according to claim 1, further comprising:
   a plurality of scanning light-source units,
   wherein each of the plurality of scanning light-source units comprises the second light source and the scanner.

7. The liquid-crystal display device according to claim 6, wherein the display has a substantially rectangular shape,
   wherein viewed from a direction perpendicular to the display, the plurality of scanning light-source units is provided near a pair of sides of the rectangular shape, respectively, and
   wherein the pair of sides is an opposing pair.

8. The liquid-crystal display device according to claim 6, wherein the plurality of scanning light-source units is disposed on a common base.

9. The liquid-crystal display device according to claim 6, further comprising:
   a reflective portion that, viewed from a direction perpendicular to the display face, is provided along an outer periphery of the display face,
   wherein the reflective portion reflects the second light to the face on the opposite side.

10. The liquid-crystal display device according to claim 7, wherein the plurality of scanning light-source units is disposed on a common base.

11. The liquid-crystal display device according to claim 7, further comprising:
    a reflective portion that, viewed from a direction perpendicular to the display face, is provided along an outer periphery of the display face,
    wherein the reflective portion reflects the second light to the face on the opposite side.

12. The liquid-crystal display device according to claim 8, further comprising:
    a reflective portion that, viewed from a direction perpendicular to the display face, is provided along an outer periphery of the display face,
    wherein the reflective portion reflects the second light to the face on the opposite side.

13. The liquid-crystal display device according to claim 1, further comprising:
    a reflective portion that, viewed from a direction perpendicular to the display face, is provided along an outer periphery of the display face,
    wherein the reflective portion reflects the second light to the face on the opposite side.

14. The liquid-crystal display device according to claim 13, further comprising:
    a reflective sheet that reflects the first light to a display side,
    wherein the reflective portion is formed by a vicinity of an outer peripheral edge of the reflective sheet bent to the display side.

15. The liquid-crystal display device according to claim 1, further comprising:
    a light guide member that is provided between the display and the plurality of first light sources,
    wherein the light guide member orients the second light to a display side.

* * * * *